US012801884B2

(12) United States Patent
Fabian et al.

(10) Patent No.: US 12,801,884 B2
(45) Date of Patent: Nov. 17, 2026

(54) CARD BODY WITH ABSORBENT CORE AND METHOD FOR PRODUCING A CARD BODY WITH ABSORBENT CORE

(71) Applicant: Giesecke+Devrient ePayments GmbH, Munich (DE)

(72) Inventors: Cristina Fabian, Munich (DE); Klaus Kohl, Munich (DE)

(73) Assignee: Giesecke+Devrient ePayments GmbH, Munich (DE)

( * ) Notice: Subject to any disclaimer, the term of this patent is extended or adjusted under 35 U.S.C. 154(b) by 0 days.

(21) Appl. No.: 18/898,364

(22) Filed: Sep. 26, 2024

(65) Prior Publication Data

US 2025/0173540 A1 May 29, 2025

(30) Foreign Application Priority Data

Sep. 27, 2023 (DE) ......................... 102023126383.8

(51) Int. Cl.
*G06K 19/077* (2006.01)

(52) U.S. Cl.
CPC . *G06K 19/07722* (2013.01); *G06K 19/07745* (2013.01)

(58) Field of Classification Search
CPC .................. G06K 19/07722; G06K 19/07745
USPC ........................................................ 235/488
See application file for complete search history.

(56) References Cited

U.S. PATENT DOCUMENTS 6,001,893 A * 12/1999 Vaidya .................... C09D 4/06 522/182

FOREIGN PATENT DOCUMENTS

| | | | |
|---|---|---|---|
| DE | 19654607 | C2 | 11/1999 |
| DE | 10205027 | A1 | 9/2003 |
| WO | 1998028717 | A1 | 7/1998 |
| WO | 2007131383 | A1 | 11/2007 |

* cited by examiner

*Primary Examiner* — Paultep Savusdiphol
(74) *Attorney, Agent, or Firm* — LNK LAW, PLLC

(57) ABSTRACT

The present disclosure relates to a card body. The card body comprises a layer composite, which has a first cover layer, a second cover layer and a core layer. The core layer is arranged between the first cover layer and the second cover layer. The core layer has at least one core layer section, which is adapted to receive a medium from an environment of the card body in order to incorporate the medium in the at least one core layer section and provide a color effect on the core layer section.

15 Claims, 3 Drawing Sheets

CARD BODY WITH ABSORBENT CORE AND METHOD FOR PRODUCING A CARD BODY WITH ABSORBENT CORE

CROSS-REFERENCE TO RELATED APPLICATION

This application claims priority to German Application No. 10 2023 126 383.8, filed Sep. 27, 2023, which is all hereby incorporated in their entirety by reference.

TECHNICAL FIELD

The present disclosure relates to card bodies with an absorbent core. In particular, the invention relates to a card body, the use of such a card body as a sub-component of a card-shaped data carrier, and a method for producing a card body for a card-shaped data carrier.

BACKGROUND

Card-shaped data carriers are used in a wide range of applications. For example, such data carriers can be used for cashless payment of goods or services, for personal identification or for access to Internet-based application programs. Accordingly, there are, for example, card-shaped data carriers in the form of chip cards in general, payment cards, such as credit cards or debit cards, as well as ID cards or identity cards. These card-shaped data carriers usually contain plastic as a base material. Sometimes, however, card-shaped data carriers are also provided with metal, wood, glass and ceramic. To improve the aesthetics or for personalization, card-shaped data carriers can be provided with different, externally visible colors in order to provide a color effect or a color impression for a viewer of the card-shaped data carrier. The colors can be provided in the form of print layers in the card-shaped data carrier or as prints on a surface of the card-shaped data carrier.

BRIEF SUMMARY

It is an object of the present application to improve the absorbability of a card body for receiving a medium.

This object is solved by the subject matter of the independent claims. Exemplary embodiments are evident from the dependent claims and from the following description.

According to an aspect, a card body is provided. The card body comprises a composite layer which has a first cover layer, a second cover layer and a core layer. The core layer is arranged between the first cover layer and the second cover layer. The core layer has at least one core layer section, which is adapted to receive a medium from an environment of the card body in order to incorporate the medium in the at least one core layer section.

The medium incorporated in the core layer section makes it possible to provide the card body with certain properties, such as color properties or odor properties. It is also possible to provide the card body with haptic properties, for example a rough structure on the edges of the card body. For example, by receiving the medium in the core layer section, a structure in the edge region of the core layer section and thus in the edge region of the card body can be changed in such a way that a haptically perceptible relief is formed there.

A color effect can be provided on the core layer section that can be perceived by a viewer of the card body. When the medium is received or absorbed into the core layer section, the medium can penetrate into deeper regions of the card body in particular, so that possible wear in the surface region or in the edge region of the card body does not necessarily result in the property provided on the card body, which is caused by the incorporated medium, being lost.

The card body may thus comprise a layer composite in which the core layer section is arranged between the two cover layers. The core layer section and the two cover layers may be present in a laminate composite, which is also referred to herein as a layer composite. In addition to the two cover layers and the core layer section, the card body may comprise further layers.

The card body may also comprise an electronic contact interface, which is provided in the area of a card surface. Alternatively or additionally, the card body may also comprise a contactless interface, for example with an antenna element or a coil. The electronic contact interface and/or the contactless interface may be configured for communication with an external reader, for example a card reader. The contactless interface may be arranged in one of the two cover layers or also in the core layer section. In addition to contactless and contact cards or card bodies, biometric cards, i.e. card bodies equipped with a finger sensor, can also be used.

It is possible that the core layer section surrounds a central region, which is also arranged between the two cover layers. In such a case, the components of the contactless interface may also be arranged in the central region or extend into it. Security features may also be provided in the card body. Such security features may also be provided in the area of a card surface.

Since the core layer section is located between the two cover layers, the core layer section may be accessible from the outside via an edge section of the card body. In particular, the card body may have a circumferential edge which is adapted such that the core layer section is accessible from the outside via the entire circumferential edge, or only via one or more edge sections of the circumferential edge. In the latter case, the property provided to the card body, which is caused by the incorporated medium, may only be provided at certain points in the edge region. For example, if the medium is a color or a color material, a color pattern may be created by providing the core layer section in sections in the edge region of the card body.

It is possible to incorporate different types of media or different forms of a medium in the core layer section. In the case of incorporating a color material, for example, different colors can be incorporated in the core layer section so that a viewer perceives different colors from the outside.

In particular, the core layer section comprises an absorbent material or an absorbent composition so that the respective medium can be permanently incorporated in the core layer section. The material comprises an absorbent material that can absorb the medium from an environment during the production of the card body.

When producing the card body, for example, the medium can be brought into a state of matter that allows the medium to be absorbed by the core layer section. For example, the medium is incorporated in small, pore-like recesses in the core layer section. The core layer section can act like a sponge that absorbs the medium and distributes it within itself. After the medium has been absorbed into the core layer section, the medium can be hardened and thus form a solid component of the produced card body.

The core layer section may be formed using a foam such as a latex foam, a polyurethane foam, a polyethylene foam, a silicone foam, a rubber foam or a composite foam. The core layer section may, for example, comprise materials such as wood, bamboo, coral, cellulose, textiles, linen or ink blotting papers. Ink blotting papers are, for example, unglued and less compressed papers that form capillaries into which the medium can be incorporated. Such materials can also ensure the absorbability of the core layer section to absorb the medium.

These absorbent materials can advantageously also bond with the cover layers, for example cover layers made of plastic. This bond can be supported by additional adhesive between the respective cover layer and the core layer section.

It should be understood that the card body may have a plurality of core layers, each of which includes a core layer section. In particular, a first core layer comprising the core layer section described herein and a second core layer comprising the core layer section described herein may be provided within a card body. A layer sequence of the card body can be provided which provides that the first cover layer is adjacent to the first core layer, an intermediate layer is in turn adjacent to the first core layer, the second core layer is in turn adjacent to the intermediate layer, and the second cover layer is adjacent to the second core layer. The two cover layers may also each be provided with a so-called overlay or may form such an overlay themselves.

According to an embodiment, the at least one core layer section is adapted to receive a gaseous and/or liquid medium.

In particular, the core layer section may be configured to absorb a gaseous and/or liquid medium during a production process, wherein the core layer section is no longer or only to a limited extent capable of absorbing the gaseous and/or liquid medium after its production. For example, the card body can be immersed in a liquid color material during its production, so that the core layer section absorbs this liquid color material during the production process. After the production process, the color material may be present in a hardened state. In this state, the card body contains the incorporated color material.

The color material may also be applied to an exposed area of the core layer section using a printing or spraying process, so that the color material is then gradually inserted into or absorbed by the core layer section in order to incorporate it into the core layer section.

A gaseous medium may also be incorporated into the core layer section in a similar way, wherein the gaseous medium can form deposits in the core layer section after being incorporated into the core layer section, which provide a certain property to the core layer section. For example, a certain odor characteristic or fragrance could be introduced into the card body.

According to an embodiment, the at least one core layer section comprises a plurality of cavities distributed within a core layer material of the at least one core layer section.

The cavities may be finely distributed within the entire core layer section. The cavities may also be formed by channels that extend through the core layer section. Likewise, the cavities may also be formed by channels that connect various larger cavities or chambers with each other. However, the core layer section is formed in particular in such a way that the medium can enter the core layer section or be absorbed by it, at least during the production process of the card body. The internal arrangement of the cavities may then promote a distribution of the medium in the core layer section. It should be understood that the receiving of the medium in the core layer section may not cause the core layer section to swell. In particular, the core layer section may retain its dimensions or extensions when absorbing the medium.

The core layer section may be completely and/or evenly interspersed with the cavities. The size of the cavities can vary along an extension direction of the core layer section. For example, the cavities can be larger in an edge region of the core layer section, which is arranged at an edge of the card body, than in a region of the core layer section located further inside the card body, or vice versa. In this manner, the absorbability or absorbency of the core layer section can be varied in certain regions.

According to an embodiment, the medium is configured to penetrate into the plurality of cavities in order to at least partially fill the plurality of cavities.

This means that the medium can either partially or completely fill the cavities. If the cavities are completely filled, the absorbability of the core layer section for the medium or another medium can be limited. In particular, when the core layer section is completely filled with the medium, the core layer section is saturated so that no further medium can be absorbed into the core layer section. This prevents the core layer section from unintentionally absorbing a medium, for example a color material, during the production of the card body.

According to an embodiment, the at least one core layer section comprises a porous material structure.

In other words, the core layer section can be porous, perforated, permeated or interspersed with channels and cavities. In particular, it can have a sponge-like structure and thus be permeable to the medium. This allows the medium to penetrate into the core layer section during the production of the card body, so that it can be incorporated in the core layer section. After penetration, the medium can be solidified in the core layer section so that it remains in the core layer section after the card body has been produced.

According to an embodiment, the at least one core layer section comprises a material structure configured to receive the medium by capillary action.

Adhesive forces can therefore act between molecules of different substances. As a result, the medium can be attracted to the core layer section when it is brought into close proximity to the core layer section and thus virtually drawn or sucked into the porous structure of the core layer section. If, for example, the core layer section is exposed to a color material during the production process of the card body, this color material is automatically drawn into the core layer section so that the core layer section is partially or completely permeated with the color material. During penetration or after penetration of the core layer section with the color material, the color material can gradually harden. In this way, the core layer section can be colored and thus provide a color effect for the card body finally produced and for a card-shaped data carrier produced using the card body.

According to an embodiment, the medium is a color material.

The color material can be a printing color or an ink. The color material can be printed onto the core layer section using inkjet printing, pad printing or screen printing, wherein the color material is drawn into the core layer section. The color material introduced into the core section can then be cured using ultraviolet radiation.

The color material can also be introduced into the core layer section by immersion in a paint bath, wherein subsequent drying can again be carried out by ultraviolet radiation or hot air.

It should be understood that other types of color application can also be used to introduce the color material into the core layer section. The color material introduced into the core layer section can at least partially or completely close the porous structure of the core layer section, so that the core layer section is more stable against mechanical influences.

According to an embodiment, the medium is an ultraviolet radiation curing ink.

In other words, drying or solidification of the ultraviolet radiation curing ink can be performed using an ultraviolet light after the ink has been drawn into the core layer section. As a result, the ink is firmly bonded to the core layer section and, in particular, can no longer escape from the core layer section.

According to an embodiment, the core layer is formed entirely by the core layer section.

This can mean that a complete layer of the layer composite of the card body is formed by the core layer section. In particular, the core layer section can form a complete intermediate layer arranged between the two cover layers. In this manner, the core layer section can simply be produced as a material layer for the layer composite, which is then bonded to the other layers of the layer composite, for example by lamination.

According to an embodiment, the at least one core layer section is arranged in an edge region of the core layer, which surrounds a central region of the core layer, wherein a material composition of the central region differs from a material composition of the core layer section.

This can mean that the core layer section does not form a complete layer of the composite layer of the card body, but rather only forms part of a layer located between the two cover layers. This means that the core layer section may only be arranged in an immediate edge region of the core layer, so that the color material can still reach the core layer section via the edge of the card body, but the penetration depth of the color material is limited. The color effect is thus still provided and the central region may fulfill other functions. For example, by choosing a stiffer material for the central region than for the core layer section, the rigidity of the entire card body can be increased.

Likewise, other components such as coils, antenna elements or chip elements may be arranged completely or partially in the central region of the core layer. In this manner, the electronic components can be separated or kept separate from the absorbent core layer section.

According to an embodiment, the at least one core layer section has an interface region to an environment of the card body, wherein the interface region of the at least one core layer section is arranged at an edge of the card body and wherein the at least one core layer section is configured to receive the medium from the environment of the card body via the interface region, so as to incorporate the medium in the at least one core layer section.

The interface region can be formed by an outwardly exposed surface of the core layer section. This outwardly exposed surface serves in particular to absorb the medium or the color from the surroundings. After production of the card body, the outwardly exposed surface can remain exposed so that the color effect remains visible to the outside. After production, i.e. after the core layer section has been penetrated by the medium, a transparent protective layer can be applied to the interface region if necessary.

For example, the interface region may be arranged at an edge section of the card body or at an entire circumferential edge of the card body. The edge can be formed by cover layer edges of the two cover layers, by an intermediate core layer section edge of the core layer section and possibly by other layer edges.

The medium may be drawn or sucked into the core layer section through the outwardly exposed surface of the core layer section, even if the two cover layers have already been applied to both sides of the core layer. In this case, the medium is drawn in from the surroundings via the exposed surface of the core layer section in the edge region of the already pre-formed card body.

According to an embodiment, the at least one core layer section comprises a latex material, a polyurethane material, a polyethylene material, a silicone material, a rubber material and/or a composite material.

The core layer section may be formed from a foam, for example a latex foam, a polyurethane foam, a polyethylene foam, a silicone foam, a rubber foam or a composite foam.

According to an aspect, a use of the card body described herein as a sub-component of a card-shaped data carrier is disclosed. For example, the card body can be used as a basic component for producing a badge document, an identity document, a chip card or a payment card.

According to an aspect, a method for producing a card body for a card-shaped data carrier is provided. In one step of the method, a first cover layer and a second cover layer are provided. In a further step, a core layer with at least one core layer section is provided, which is adapted to receive a medium from an environment. In a further step, the first cover layer, the second cover layer and the core layer are laminated in order to form a layer composite in which the core layer is arranged between the first cover layer and the second cover layer. In a further step, a medium is introduced into the at least one core layer section before or after the formation of the layer composite, so that the medium is incorporated in the at least one core layer section. In a further step, the medium introduced into the at least one core layer section may be cured.

The mentioned process steps may be carried out in the indicated order.

Introducing the medium into the at least one core layer section before the layer composite is formed has the advantage that the medium can be introduced into the core layer section via several surface sections that are still exposed. In contrast, a smaller surface section may remain after the layer composite has been formed, for example in the edge region of the layer composite, via which the medium can then be introduced into the core layer section.

DETAILED DESCRIPTION

The illustrations in the figures are schematic and not to scale. If, in the following description of the figures, the same reference signs are used in different figures, these designate the same or similar elements. However, identical or similar elements may also be designated by different reference signs.

Figure 1:
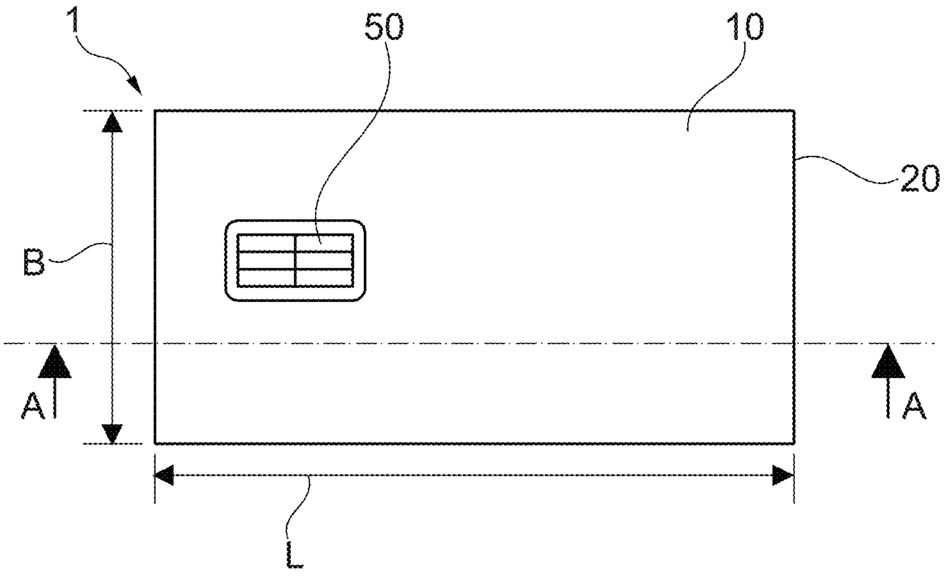
FIG. 1 shows a card-shaped data carrier.

FIG. 1 shows a card-shaped data carrier 1. The card-shaped data carrier 1 can have a card body 10 which comprises several layers that have been joined together, for example in a lamination process. The card body 10 can have a circumferential edge 20, which is formed by four essentially straight edge sections. Two opposite edge sections extend with the length L and two further opposite edge sections extend with the width B. The card body 10 can, for example, have an ID-1 card format. The card-shaped data carrier 1 can also have a chip module 50, which is integrated in a surface region of the card body 10.

Figure 2:
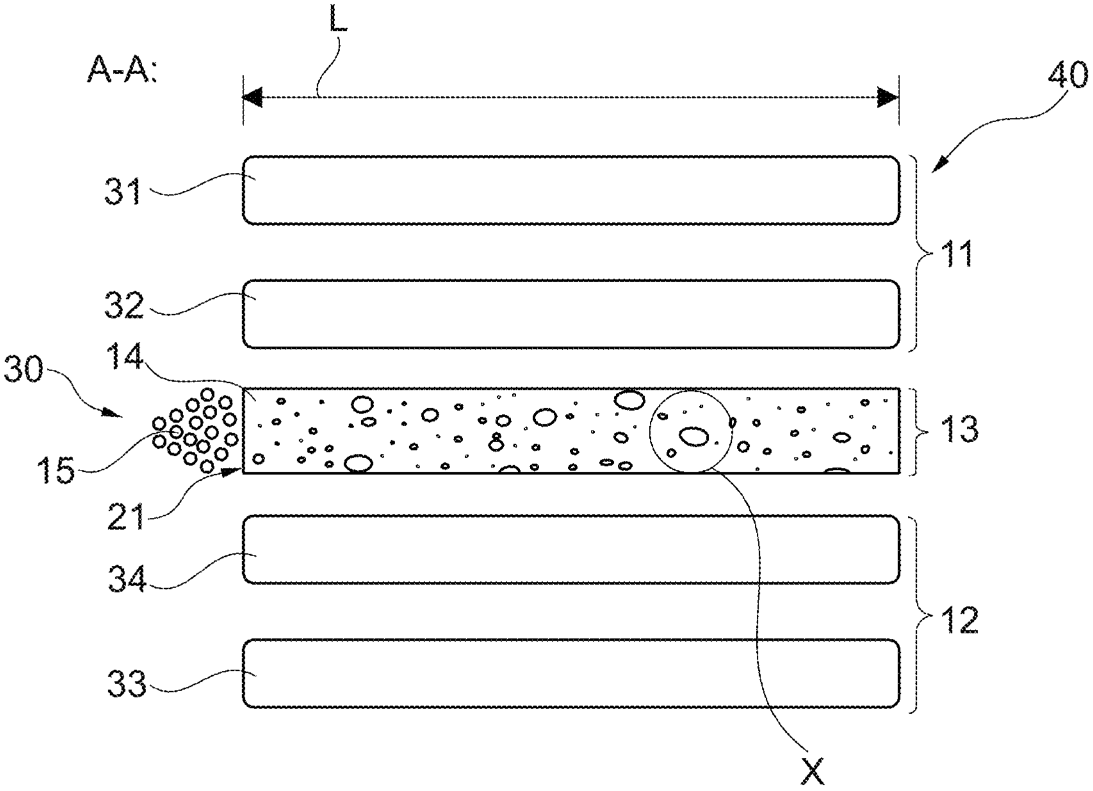
FIG. 2 shows a cross-section through a card body of the card-shaped data carrier of FIG. 1.

FIG. 2 now shows the cross-section A-A through the card body 10 of the card-shaped data carrier 1 of FIG. 1. The card body 10 comprises a first cover layer 11, a second cover layer 12 and a core layer 13, wherein the layers together form a layer composite 40. In the example shown, the first cover layer 11 is a partial layer composite with a first cover layer ply 31 and a first intermediate layer 32, wherein the first intermediate layer 32 is arranged between the first cover layer ply 31 and the core layer 13. Similarly, in the example shown, the second cover layer 12 is a partial layer composite with a second surface layer ply 33 and a second intermediate layer 34, wherein the second intermediate layer 34 is arranged between the second cover layer ply 33 and the core layer 13. The two cover layer plies 31, 33 can each form a surface area of the card body 10. Further layers may be arranged in the layer composite 40 of the card body 10. The intermediate layers 32, 34 can also be omitted.

The core layer 13 has a core layer section 14 or consists of such a core layer section 14. In the case shown in FIG. 2, the core layer section 14 completely forms the entire core layer 13. The core layer section 14 is designed to receive a gaseous or liquid medium 15 from an environment 30 of the card body 10, so as to incorporate the medium 15 in the core layer section 14. For this purpose, the core layer section 14 may comprise an interface region 21 to the environment 30, via which the medium 15 can be received from the environment 30, so as to incorporate the medium 15 in the core layer section 14. The medium 15 can be applied in a printing process or spraying process to an exposed area of the core layer section 14, which forms the interface region 21, so that the medium 15 is then gradually drawn into or absorbed by the core layer section 14, so as to incorporate it in the core layer section 14. Furthermore, the card body 10 or only the core layer section 14 alone can be immersed in an immersion bath so that the medium 15 can be drawn into the core layer section 14.

Figure 3:
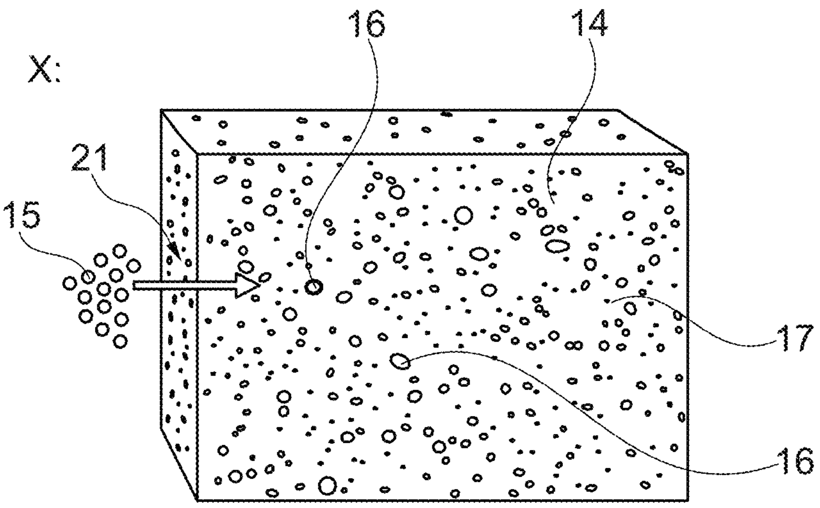
FIG. 3 shows a section of a core layer section of the card body of FIG. 2.

FIG. 3 shows the section X of the core layer section 14 of the card body 10 of FIG. 2. In this illustration, an exemplary material structure of the core layer section 14 is shown. The core layer section 14 comprises small cavities 16, which are distributed within a core layer material 17 of the core layer section 14, so that a porous material structure is created. The cavities 16 can have different sizes. The cavities 16 within the core layer section 14 can be interconnected by channel-like structures, so that the medium 15 can ultimately be distributed through the channel-like structures and in the cavities 16. The medium 15 thus enters the plurality of cavities 16 and fills them.

The medium 15 can be drawn from an environment 30 into the core layer section 14 via the interface region 21 during a production process. Capillary forces can act here, drawing the medium 15 into the cavities 16 of the core layer section 14.

This process can be carried out before or after applying the first cover layer 11 and/or the second cover layer 12 to the core layer section 14. For example, only the produced core layer section 14 can first be exposed to the medium 15, so that the medium 15 can be introduced into the core layer section 14 via all outer surfaces of the core layer section 14. Alternatively or additionally, the produced core layer section 14 can first be bonded to the first cover layer 11 and/or the second cover layer 12 and then the layer composite 40 can be exposed to the medium 15, so that the medium 15 can be introduced into the core layer section 14 via an edge region, for example the edge region of the core layer section 14 shown in FIG. 2 as interface region 21.

Figure 4:
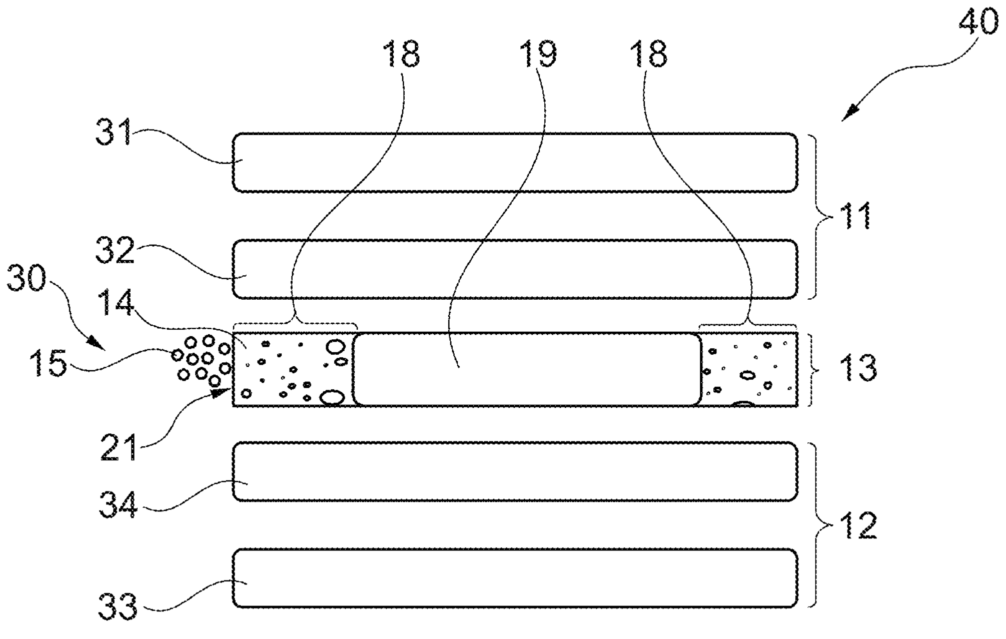
FIG. 4 shows a cross-section through an alternative card body of the card-shaped data carrier of FIG. 1.

FIG. 4 now shows a cross-section through an alternative card body 10 of the card-shaped data carrier 1 of FIG. 1. As can be seen, the core layer section 14 is arranged only in a partial section 18 or in an edge region 18 of the core layer 13, so that the core layer 13 is now formed by the partial section 18 and a central region 19. A material composition of the central region 19 can differ from a material composition of the core layer section 14 in order to adapt the core layer 13 with regard to its structural and functional properties to the respective desired requirements. For example, the central region 19 can have a non-porous plastic material or metallic material, so that the absorbent core layer section 14 is only present in the partial region 18 where the medium 15 is incorporated. Viewed in a layer plane of the core layer 13, the core layer section 14 can be arranged around the central region 19. Since the central region 19 is thus surrounded by the core layer section 14 on the one hand and by the cover layers 11, 12 on the other hand, the central region 19 is not visible or accessible from the outside of the card body 10. Only the core layer section 14 can be visible or accessible with its interface region 21, i.e. at the edge 20 of the card body 10.

If the medium 15 is a color material that was incorporated in the core layer section 14 during a production process and was subsequently cured, a card body 10 or a card-shaped data carrier 1 whose edge has this color can be provided after the production process. This applies both to the card body 10 shown in FIG. 2 and to the card body 10 shown in FIG. 4.

Figure 5:
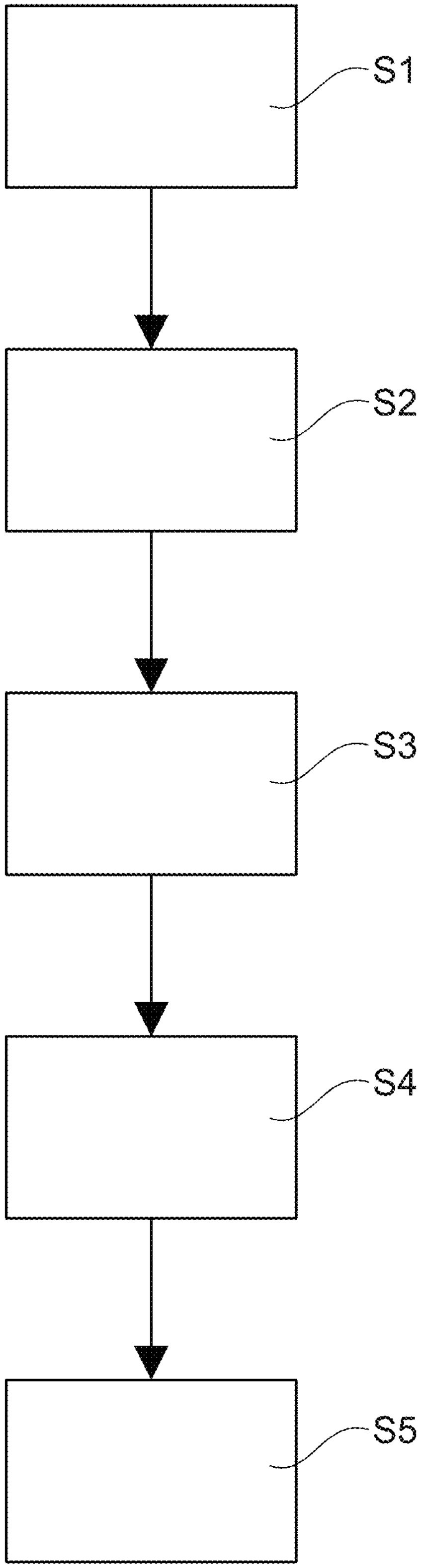
FIG. 5 shows a flow diagram of a method for producing a card body.

FIG. 5 shows a flow diagram of a method for producing a card body for a card-shaped data carrier, for example a method for producing the card body 10 for the card-shaped data carrier 1 of FIG. 1. In a step S1, a first cover layer 11 and a second cover layer 12 are provided. In a step S2, a core layer 13 with at least one core layer section 14, which is adapted to receive a medium 15 from an environment 30, is provided. In a step S3, the first cover layer 11, the second cover layer 12 and the core layer 13 are laminated in order to form a layer composite 40 in which the core layer 13 is arranged between the first cover layer 11 and the second cover layer 12. In a step S4, a medium 15, in particular an ink, is introduced into the at least one core layer section 14 before or after the layer composite 40 is formed, so that the medium 15 is incorporated in the at least one core layer section 14. In a step S5, the medium 15 introduced into the at least one core layer section 14 is cured.

The invention claimed is:

1. A card body for a card-shaped data carrier, comprising:

a layer composite, which has a first cover layer, a second cover layer, a core layer, and a medium having at least one of an odor and a color;

wherein the core layer is arranged between the first cover layer and the second cover layer;

wherein the core layer has at least one core layer section which is adapted to receive the medium from an environment of the card body, in order to incorporate the medium in the at least one core layer section.

2. The card body according to claim 1, wherein the at least one core layer section is adapted to receive a gaseous and/or liquid medium.

3. The card body according to claim 2, wherein the at least one core layer section comprises a plurality of cavities distributed within a core layer material of the at least one core layer section.

4. The card body according to claim 3, wherein the medium is configured to penetrate into the plurality of cavities so as to at least partially fill the plurality of cavities.

5. The card body according to claim 4, wherein the at least one core layer section comprises a porous material structure.

6. The card body according to claim 5, wherein the at least one core layer section comprises a material structure which is configured to receive the medium by capillary action.

7. The card body according to claim 6, wherein the medium is a color material.

8. The card body according to claim 7, wherein the medium is an ultraviolet radiation curing ink.

9. The card body according to claim 8, wherein the core layer is completely formed by the core layer section.

10. The card body according to claim 8, wherein the at least one core layer section is arranged in an edge region of the core layer, which surrounds a central region of the core layer, wherein a material property of the central region differs from a material property of the core layer section.

11. The card body according to claim 10, wherein the at least one core layer section has an interface region to an environment of the card body;

wherein the interface region of the at least one core layer section is arranged at an edge of the card body;

wherein the at least one core layer section is configured to receive the medium from the environment of the card body via the interface region, so as to incorporate the medium in the at least one core layer section.

12. The card body according to claim 11, wherein the at least one core layer section comprises a latex material, a polyurethane material, a polyethylene material, a silicone material, a rubber material and/or a composite material.

13. The card body according to claim 12, wherein use of the card body is a sub-component of a card-shaped data carrier.

14. A method for producing a card body for a card-shaped data carrier, comprising:

providing a first cover layer and a second cover layer;

providing a core layer with at least one core layer section which is adapted to receive a medium from an environment;

laminating the first cover layer, the second cover layer and the core layer to form a layer composite in which the core layer is arranged between the first cover layer and the second cover layer;

introducing a medium into the at least one core layer section before or after forming the layer composite, so that the medium is incorporated in the at least one core layer section, wherein the medium has at least one of an odor and a color.

15. The method according to claim 14, comprising:

curing the medium introduced into the at least one core layer section.

* * * * *